C. P. FEEBUSCH & J. O. ROBERTS.
CASTER.
APPLICATION FILED MAY 28, 1917.
1,271,559.
Patented July 9, 1918.
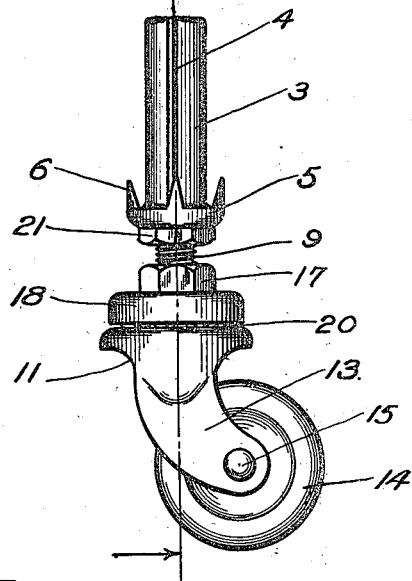
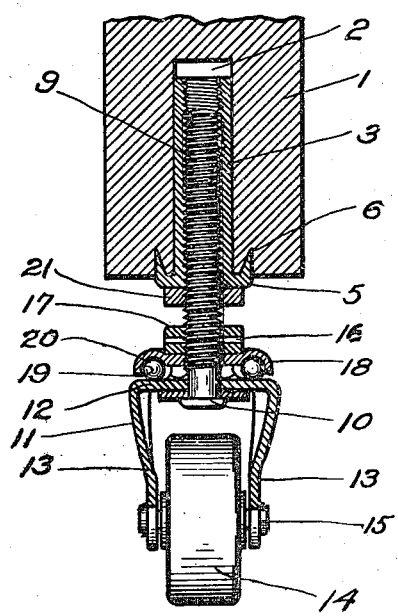
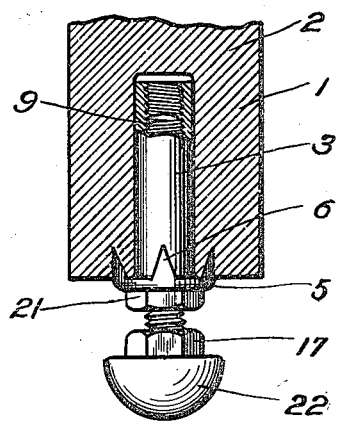
INVENTORS
Charles P. Feebusch.
Julius O. Roberts.
BY
Arthur C. Brown
ATTORNEY

UNITED STATES PATENT OFFICE.

CHARLES P. FEEBUSCH, OF KANSAS CITY, MISSOURI, AND JULIUS O. ROBERTS, OF SALINA, KANSAS.

CASTER.

1,271,559.   Specification of Letters Patent.   Patented July 9, 1918.

Application filed May 28, 1917. Serial No. 171,417.

*To all whom it may concern:*

Be it known that we, CHARLES P. FEEBUSCH, a citizen of the United States, residing at Kansas City, Jackson county, Missouri, and JULIUS O. ROBERTS, a citizen of the United States, residing at Salina, Saline county, Kansas, have invented certain new and useful Improvements in Casters; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to casters for tables, beds, chairs, etc., and has for its principal object to provide a device of this character that may be adjusted within its mounting to adapt the object to which it is applied to uneven floor surfaces or to compensate for any difference in length of the caster carrying parts, so as to provide a solid bearing for the supported object.

In accomplishing this object, we have provided improved details of structure, the preferred forms of which are illustrated in the accompanying drawings, wherein:—

Figure I is a side view of a caster constructed according to the present invention.

Fig. II is a longitudinal section of the same.

Fig. III is a modified form of caster having a semi-spherical head instead of the usual roller.

Referring more in detail to the drawings:

1 designates the leg or other supporting member of piece of furniture or the like, to which the caster may be applied, and which is provided at its lower end with a bore 2 wherein an internally threaded receiving body sleeve 3 is located; the sleeve being of such diameter that it fits snugly within the bore and provided with longitudinally extending ribs 4 along its outer sides for preventing the sleeve from turning within the mounting piece. At its lower end the sleeve has a peripheral base flange 5 for seating against the base of the leg to limit its inward movement and which is provided about its edge with upwardly extending points 6 which may be driven into the base of the leg to anchor the sleeve firmly in the carrying member.

Threaded into the sleeve is a shank 9 which projects from the open end of the sleeve and at its lower end has an unthreaded head portion 10 that carries a floor contact member, preferably comprising a roller carrying yoke 11 that is pivotally mounted on said head and comprises a horizontal base 12 having downwardly extending spaced legs 13—13' at opposite sides between which a roller or wheel 14 is revolubly mounted on a transverse pin 15.

Fixed on the shank 9, preferably by a pin 16, is a nut 17 and seated against the under side of said nut is a plate 18 comprising an annular ball race 19 which retains anti-friction balls 20 in contact with the yoke head to permit free and easy pivoting of the roller yoke about its mounting.

The shank 9 may be adjusted longitudinally in the sleeve by turning the nut 17 and may be locked at an adjusted position by a lock nut 21 that is threaded onto the shank and adapted to bear against the sleeve head flange 5.

In Fig. III we have shown a caster wherein the semispherical ball head 22 is fixed to the end of the shank 9; the head 22 being smooth so that it may slide over a floor surface without causing it to be marred or otherwise damaged.

In assembling the casters with the bodies upon which they are to be used, the sleeves 3 are first located in the bores 2 of the leg or other supporting parts of the object to which they are applied, and the shank 9, with the rollers and nuts 17 fixed thereon, are threaded within the sleeves by applying a wrench to the fixed nuts 17. The shanks are then locked in the adjusted positions by tightening the lock nuts 21 against the ends of the sleeves 5 to prevent the shanks from being displaced longitudinally.

It is apparent that by manipulation of the nuts 17 and 27 the casters may be adjusted to or from the mounting sleeves to provide a solid bearing for the supported object and may be adjusted to level the latter if it is placed on an uneven support or floor.

It is further apparent that the roller is not loose within the sleeve and cannot drop therefrom when the supported object is carried or moved about.

While we have referred specifically to, and illustrated certain details of structure, it is apparent that there may be modifications within the scope of invention.

Having thus described our invention, what we claim as new therein, and desire to secure by Letters-Patent, is:

A caster comprising an internally threaded sleeve having ribs extending longitudinally along its outer surface and having an annular base flange provided with upwardly projecting points, a shank threaded onto said sleeve and extending from the lower end thereof, a yoke pivotally mounted on said shank, a roller mounted in said yoke, a nut fixed on the shank adjacent the yoke, anti-friction members seated between the yoke and nut, and a lock nut threaded onto the shank adapted to engage the end of said sleeve for the purpose set forth.

In testimony whereof we affix our signatures.

CHARLES P. FEEBUSCH.
JULIUS O. ROBERTS.